June 18, 1929.  J. REECE ET AL  1,718,073
POWER TRANSMISSION
Filed Dec. 4, 1925  6 Sheets-Sheet 1

Inventors.
John Reece
Franklin A. Reece
by Rogers, Kennedy & Campbell,
Attys.

June 18, 1929.  J. REECE ET AL  1,718,073
POWER TRANSMISSION
Filed Dec. 4, 1925   6 Sheets-Sheet 4

Inventors.
John Reece
Franklin A. Reece
by Rogers, Kennedy & Campbell,
Attys.

Inventors.
John Reece
Franklin A. Reece
by Rogers, Kennedy & Campbell,
Attys.

June 18, 1929.  J. REECE ET AL  1,718,073
POWER TRANSMISSION
Filed Dec. 4, 1925   6 Sheets-Sheet 6

Inventors.
John Reece
Franklin A. Reece
by Rogers, Kennedy & Campbell,
Attys.

Patented June 18, 1929.

1,718,073

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed December 4, 1925. Serial No. 73,164.

This invention relates to power transmission, and involves apparatus adapted to be used in various situations and for various purposes where varying speeds of transmission are required, for example as a part of the power transmission apparatus of motor vehicles, especially those in which the source of power is an internal combustion engine.

The general object of the invention is to afford more effective and convenient power transmission for the purposes mentioned, and more particularly to provide a mechanism wherein the speed ratio and delivered torque are self adjusting to the conditions of load or resistance; and whereby the prevailing clutch and change speed gears used on motor vehicles are dispensed with. An instance of transmission apparatus of this class is shown in the prior patent of one of us, Number 1,461,557 of July 10, 1923. In such prior structure, a number of centrifugal masses are employed, each movably mounted so that it can travel outwardly and inwardly, in a circular or planetary path, upon a revolving support which is turned by the power of the engine, each mass being attached to the planetary carrier or gear, the latter having connections from a driven part of the apparatus such that the mass is caused to planetate at a rate dependent on the difference in speed between the driving and driven members or shafts; each mass being thus, in one phase, forced inwardly against its centrifugal force, which force is thus transmitted as driving torque to the driven shaft, until the mass, reaching its innermost position enters a second phase and moves outwardly, while a pawl and ratchet, or other one-way device, then coming into action, prevents the transmission of the centrifugal force as a reverse drive to the driven shaft; the intermittent impulses or thrusts thus delivered being converted into a constant resilient thrusting torque upon the ultimate driven shaft through a driving or propelling spring, interposed at a point between the pawl and ratchet and the ultimate shaft, into which spring the energy is delivered by impulses, stored, and drawn out steadily by the shaft. While such prior apparatus will deliver torque at self adjusting speed ratio from an engine to a driven shaft, the operation and action are not wholly effective and satisfactory for motor vehicle purposes; and a special object of the present invention is to improve upon the prior apparatuses in various respects, and thus render the stated principles practically available for the uses set forth. The several specific features of improvement and the advantages thereby attained will be elucidated in the hereinafter following description of an illustrative embodiment of the invention, and other advantages will be apparent to those skilled in the subject.

To the attainment of the objects and advantages referred to the present invention consists in the novel power transmission apparatus, and the novel features of combination, arrangement, operation, mechanism and detail herein illustrated or described.

In the accompanying drawings Fig. 1 may be considered a rear elevation of a transmission apparatus embodying the present invention, taken partly in section on the lines 1—1 of Fig. 7. The word "rear" is used with respect to the application of the apparatus to a motor vehicle, it being seen in Fig. 1 looking from the rear of the vehicle, and this statement will apply also to the words front, right and left.

It will be convenient to describe the present invention in the following order. First will be described the "driving" parts, which turn with, or are revolved by, the engine shaft; next the fixed casing enclosing these and others of the parts; then the centrifugal masses which are revolved or carried around by the driving parts to create centrifugal force therein; next the mechanical connections by which the centrifugal masses are actuated, or caused to be drawn inwardly against the centrifugal force, whereby such force is delivered through such connections; then the driven parts which precede the transmitting spring, and are therefore not the final driven parts, and which for convenience may be termed the intermediate parts of the transmission, these parts, when turning slower than the driving parts, operating through the connections to actuate the centrifugal masses; then the one-way device or controller, in the nature of a pawl and ratchet, permitting the intermediate parts to rotate forwardly but preventing backward rotation; then the transmitting spring or equivalent resilient propelling device, acting as a power reservoir, receiving energy from the intermediate parts and supplying it to the ultimate driven parts; then the final driven parts or driven shaft, which in a motor vehicle is in direct mechanical connection with the vehicle axles and wheels. Supplementally will be described a suitable reversing mechanism for changing the direction of drive of the driven parts; and an oil circulation system.

Figure 2:
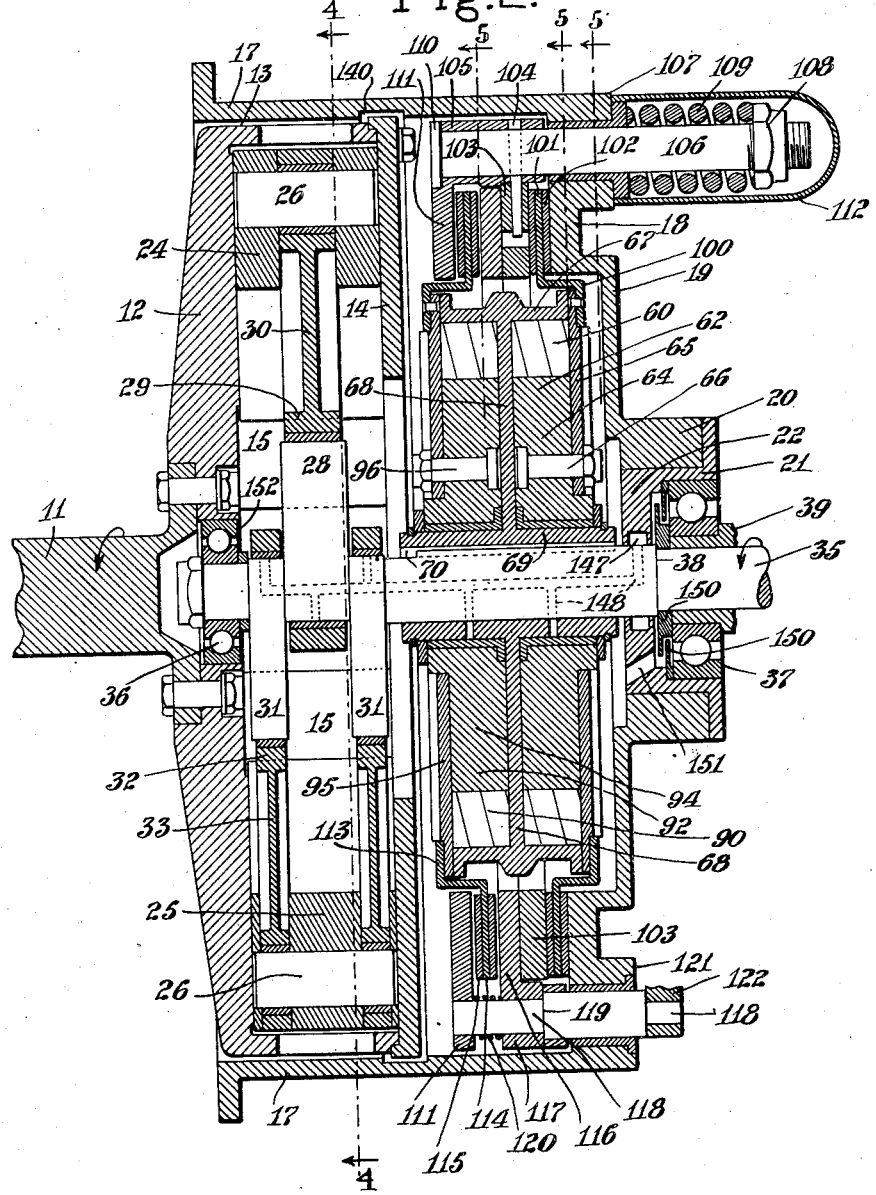
Fig. 2 is a central section taken on the bent line 2—2 of Fig. 1, and looking from the left.
Figure 4:
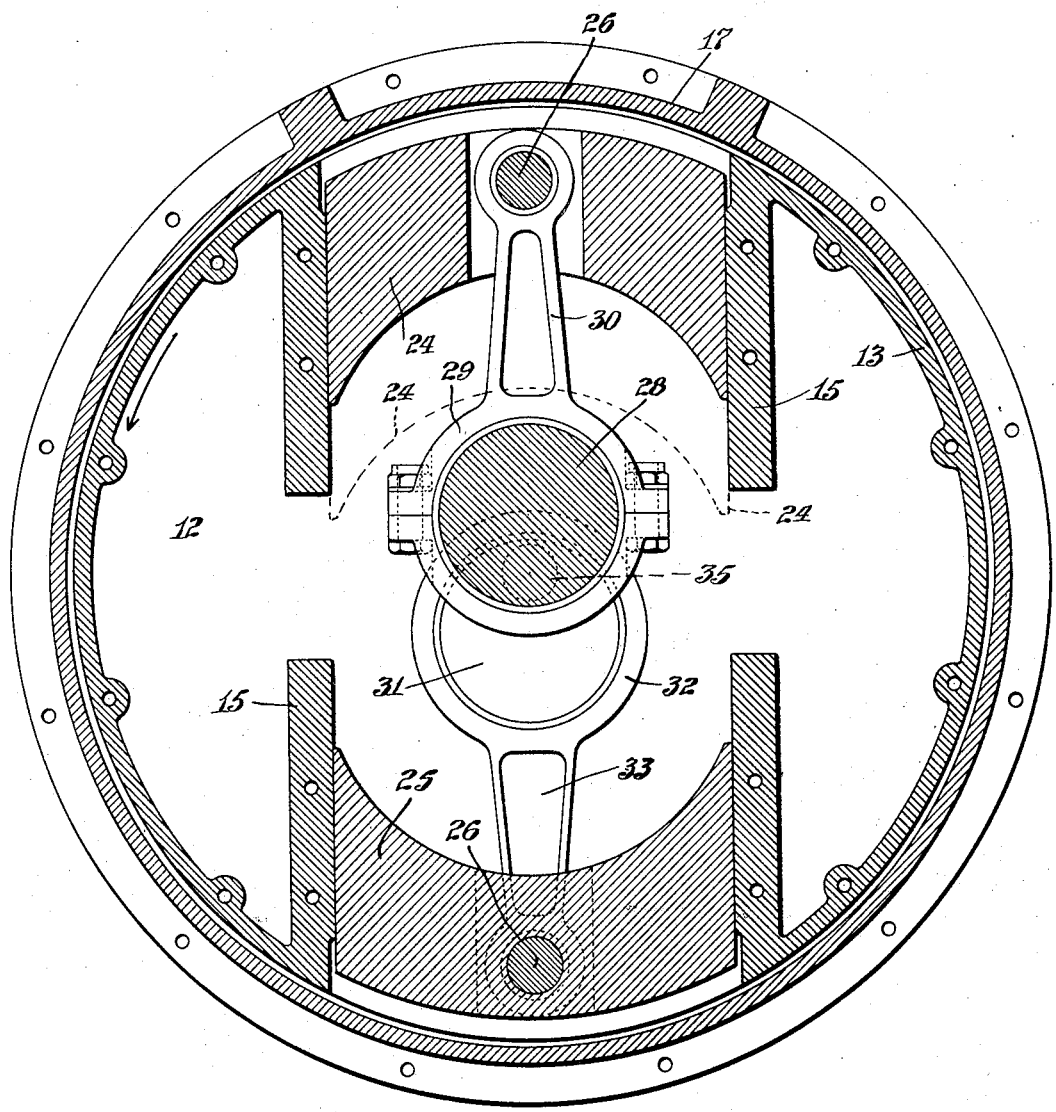
Fig. 4 is a transverse section on the line 4—4 of Fig. 2, looking from the rear.

In Fig. 2 is shown the power or driving shaft 11, which may be the crank shaft of an internal combustion engine. To this is attached a revolving support or disk 12, which encloses and gives support to the centrifugal masses and their actuating means as will be described. The disk 12 at its periphery is shown extended into a cylindrical wall or shell 13, and secured over the rear end thereof is the cover or disk 14, facing and complementary to the disk 12. Between the disks 12 and 14, as seen also in Fig. 4, are suitable guiding means for the radially moving centrifugal masses 24 and 25, consisting of parallel walls 15 extending rearwardly from disk 12 and arranged to guide radially the masses sliding between them. The elements thus far enumerated constitute substantially the driving parts of the apparatus and their substantial weight and diameter afford the desired fly wheel effect.

Enclosing these and other parts is a generally cylindrical fixed outer or main casing 17. This is spaced slightly outward of the revolving driving parts, and extends rearwardly sufficiently to enclose the reversing mechanism to be later described, and then inwardly into proximity to the rotating parts. The rear wall of the casing may comprise an annular outer portion 18 of substantial thickness, formed with certain bosses as will be described, and a thinner annular inner portion 19 terminating in a cylindrical hub or boss 20, within which is fitted a flanged sleeve 21 having an annular portion 22 extending into contact with the intermediate shaft. Other portions and details of the fixed elements of the apparatus will be described in connection with the portions of the mechanism to which they pertain.

Referring to the centrifugal masses, these, while they might be variously constructed and arranged to move inwardly and outwardly during revolution, are herein shown of an advantageous construction and operation, namely in the form of simple, radially sliding weights 24 and 25, mounted and confined between the driving disks 12 and 14 and the guides 15 thereon, as best shown in Figs. 2 and 4, with motions resembling that of a piston in its guiding cylinder. It will be understood that when the engine has been brought to substantial speed the resulting centrifugal force constantly thrusts outwardly upon the masses 24 and 25, but that, except when driving at unit ratio, in which case the masses have no relative movement and in fact the entire mechanism revolves as a unit without play, the masses alternately being drawn inwardly in one phase and allowed to return outwardly in the succeeding phase, with respect to the general center line or axis of the mechanism or driving parts. In the inward or first phase the centrifugal force of the masses is transmitted to the driven parts, whereas in the return or outward phase the one-way device to be described prevents transmission, in the wrong direction to the driven parts. The entire action will be described after describing the details of the masses, their actuation, the intermediate parts and the one-way device.

Each of the masses 24 and 25 carries a centrally arranged pin or stud 26, and has its body suitably cut away surrounding the stud to accommodate the actuating connections next to be described; and the masses may be arc-shaped as shown so as to accommodate the maximum amount of metal while allowing clearance to prevent contact with other parts during their inward and outward movements. Figs. 2 and 4 show the masses in their extreme outward positions, and in Fig. 4 is shown in dotted lines the position of the mass 24 at its extreme inward position.

The actuating connections for the centrifugal masses, operating when the intermediate or driven parts are stationary or turning at slower speed than the driving parts, may consist of any mechanical means by which the relative rotation or speed difference is communicated as inward and outward reciprocation to the masses. Thus an eccentric 28 is shown, formed or mounted on the intermediate shaft 35 to be described, and operating through an eccentric strap 29 and strap arm 30 extending to the pin 26 of the mass 24; while a pair of spaced apart eccentrics 31 operate through straps 32 and arm 33 extending to the pin 26 of the mass 25, giving a symmetrical and balanced arrangement. It is clear that any relative rotation, or difference in speeds of the driving and driven parts, will cause the eccentrics to reciprocate the masses between their extreme outward and inward positions. If the driven parts are held stationary, the speed ratio is zero, and the rate of reciprocation will be maximum, for a given engine speed; whereas if the load conditions are such that the driven parts will turn at the same speed as the engine shaft there will be no relative rotation, and the masses will stand in a balanced condition, for example near their outermost positions.

Figure 3:
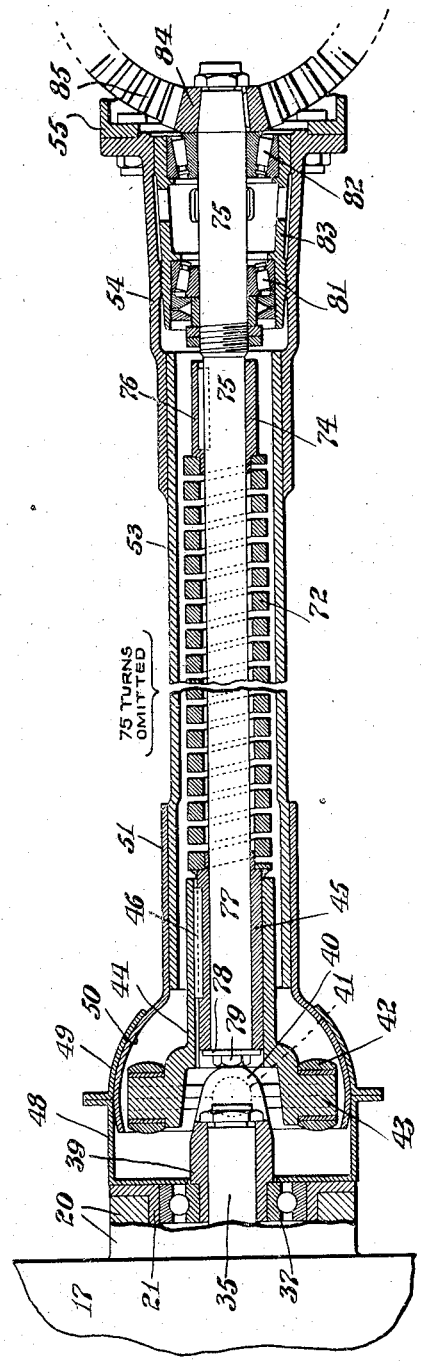
Fig. 3 is a view corresponding with Fig. 2 and duplicating some of the elements therein, but showing the elements extending rearwardly from the transmission to the rear axle of the vehicle.

The intermediate rotary parts of the illustrated apparatus comprise the shaft 35, which carries the eccentrics 28, 31, 31 already referred to. It will be understood that the shaft 35 is in one sense a driven shaft, but as herein operated it is advanced, always in one direction, but intermittently, and is therefore preferably followed by a transmitting spring or equivalent means from which the eventual driven shaft may draw energy in a continuous or steady manner. The intermediate shaft may be conveniently termed a propeller shaft as it delivers propelling torque to the transmitting spring and the driven parts beyond, and the spring likewise may be termed a propeller spring. The shaft 35 extends through the length of the main casing 17, and at its forward end is shown provided with a ball bearing 36 between it and the driving disk 12, and at the rear end of the casing with a similar bearing 37. At an interior point the shaft 35 is formed with a shoulder 38 for positioning certain parts. Near its rear end the shaft has keyed to it a sleeve 39, shown in Figs. 1, 2, 3 and 5, which may be a part of a universal joint, by which the rotation may be transmitted to a shaft or sleeve extending rearwardly. Thus Fig. 3 shows, on the sleeve 39, ears 40 supporting pivot studs 41 of a ring 42, which has, at right angles to studs 41, the studs 43 supported by a sleeve 44 extending rearwardly and coupled to an interior sleeve 45 by a spline 46 which compels the two to rotate in unison, while permitting free longitudinal movement. The sleeve 45 transmits the rotary thrust through a resilient means, as already stated, to the driven parts beyond.

It will be convenient here to supplement the description of the enclosing parts, by referring to those shown in Fig. 3. Attached to the rear side of the fixed sleeve 21, is shown a shell 48, of cylindrical or spherical shape with its spherical extension 49, surrounding and housing the universal joint 40—44. An interior spherical shell 50 engages the outer one 49, permitting universal motion, and a rearwardly extending sleeve 51 is formed integrally with the spherical shell 50. Inside the sleeve 51 is a longitudinal sleeve 53 telescoping therewith. This constitutes the propeller housing and extends rearwardly nearly to the rear axle and is attached to an outer sleeve 54, which is somewhat flaring toward the rear, and flanged for attachment to a portion of the casing 55 enclosing the usual rear end gearing.

Figure 5:
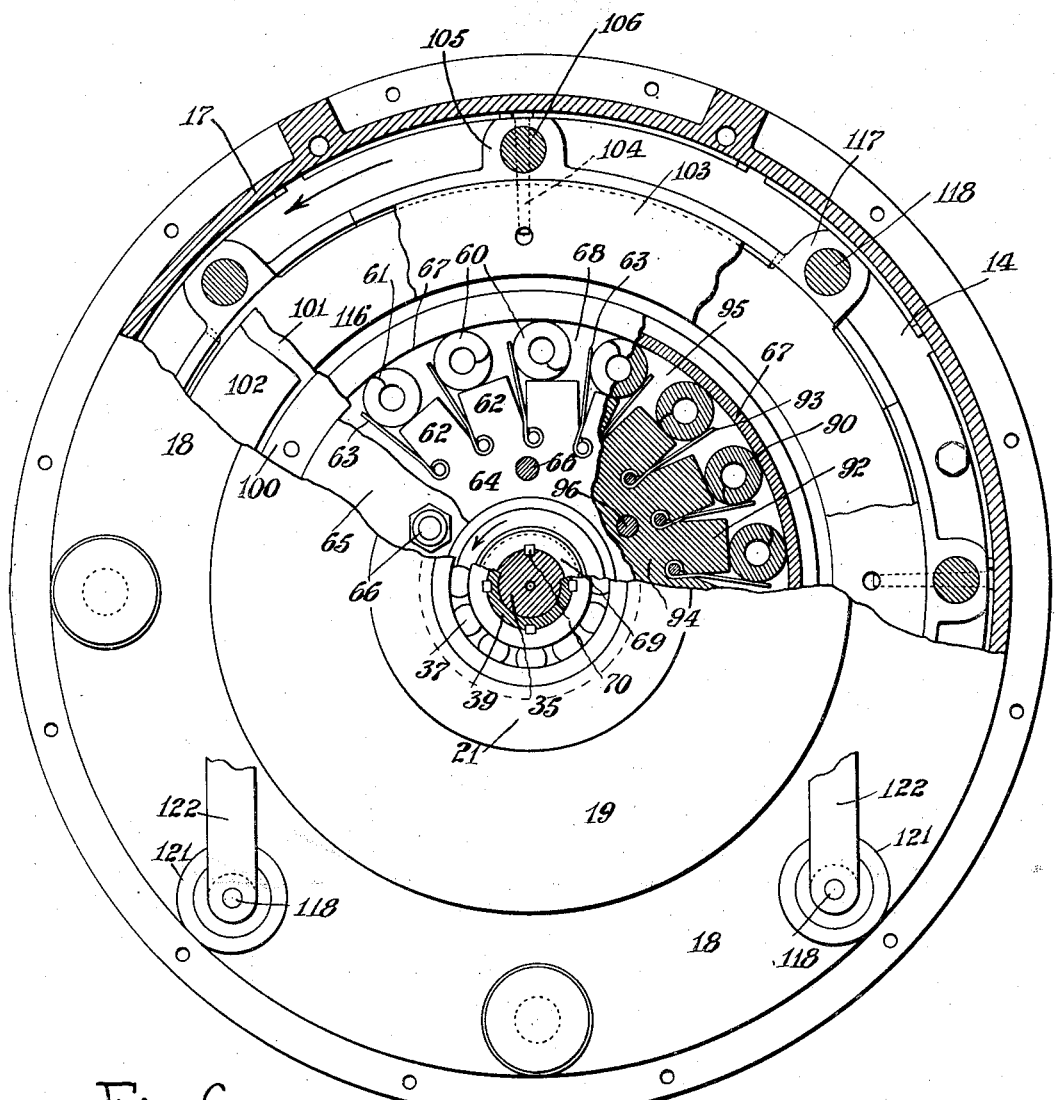
Fig. 5 is a rear elevation partly broken away or sectioned approximately on the three successive lines marked 5 in Fig. 2, to show the interior structure.
Figure 6:
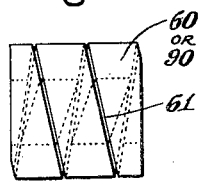
Fig. 6 is a side elevation of one of the silent or friction rollers or pawls of Fig. 5.
Figure 7:
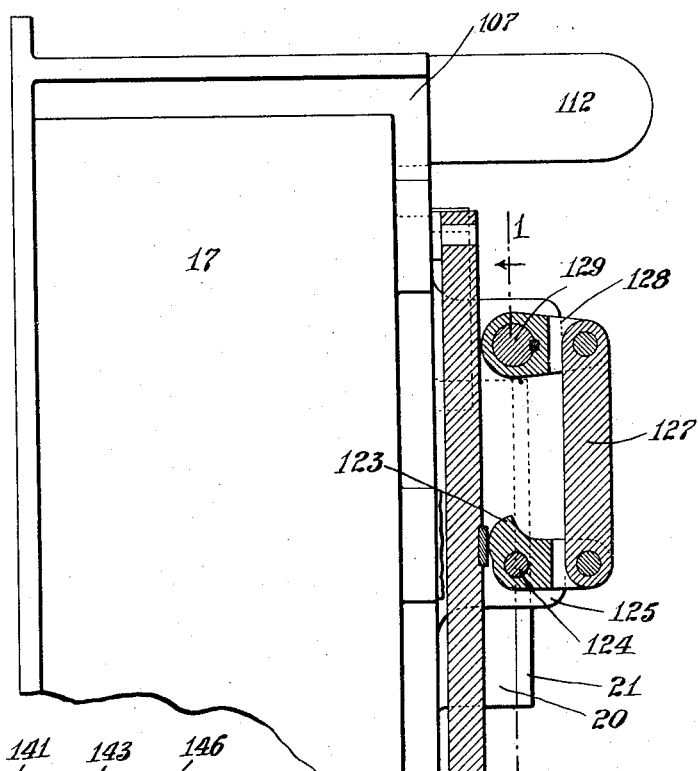
Fig. 7 is a general left elevation, taken partly in section on the line 7—7 of Fig. 1.

Referring next to the one-way device, in the nature of a pawl and ratchet, which allows the intermediate shaft 35 to be thrust in a forward direction, but prohibits it from turning reversely, this is sufficiently illustrated in Figs. 2, 5 and 6. It consists preferably of a so-called silent pawl or friction roller, or rather a multiple number of them, each operating by a wedging action to give a driving grip in one direction, but no drive or grip in the other direction. The drawings show a main one-way device, and a second one operating in the opposite direction, but here will be described only the main one, taking part in the forward drive. The mechanism is shown in Figs. 2 and 7 in that adjustment in which forward drive will be delivered to the intermediate and driven parts. A series of rolling pawls or grippers 60 is shown. An important feature is the use, for this purpose, of resilient rollers, cylindrical or spherical, capable of a minute but effective compression or flattening, for example hollow steel rolls formed with helical slits 61, as shown more particularly in Fig. 6. Owing to the slight cushioning afforded this results in a smoother and less abrupt wedging or gripping action, and owing to the slight yield the gripping and holding efficiency is materially enhanced, the line contact being widened into an appreciable surface contact, increasing the friction and reducing the pressure for area unit.

The several rolling pawls 60 are arranged to be wedged between opposing surfaces, one of which is stationary and the other connected to the intermediate shaft 35, in such way that the shaft can turn freely in its forward direction, that is, in the same direction with the driving shaft, counterclockwise in Fig. 5, but, upon receiving a thrust in the reverse direction, causes the rollers to roll into wedging engagement and grip, thus holding the shaft against rotation, namely during the phase in which centrifugal force is tending to turn the shaft 35 in a reverse direction. Preferably the stationary wedging abutments 62 are located inwardly of the rollers 60. For each roller is shown provided a leaf spring 63 or equivalent means tending always to press the roller into wedging engagement. The rollers will have a creeping action, distributing any wear. Figs. 2 and 5 show a practical form for the described parts, the abutments 62 formed as integral extensions of a disk 64, which is held stationary in a manner that will be described in connection with the description of the reversing mechanism. A cover plate 65 attached by bolts 66 to the disk 64 confines the rollers.

Exterior of the series of rollers 60 is a wedging rim 67, facing the inclined wedging faces of the abutments 62. The rim 67 is at the periphery of a web 68 having an elongated hub 69 surounding the intermediate shaft 35 and connected therewith by a spline 70 in suitable keyways, so that the web, hub and rim may shift slightly axially, for purposes to be described, while locked to rotate with the shaft.

The action of the centrifugal masses 24 and 25 may be further described as follows. They are carried on the driving parts of the apparatus, namely, the support or fly wheel disk 12 and the radial guides 15 and are thereby carried around and energized with centrifugal force. Their inward and outward movements, with reference of course to the general axis or center line of the driving parts, are produced through the eccentrics 28 and 31, which are formed with the intermediate or propeller shaft 35, in such manner that when these intermediate parts are held stationary or turned more slowly than the driving parts the eccentrics will draw inwardly the masses and then allow them to return outwardly. The driving parts are to be considered as turning counterclockwise as indicated by the arrow in Fig. 4. The intermedate parts are under the control of the one-way device, which permits their rotating counterclockwise but prohibits their turning clockwise. It may simplify consideration to assume first that the driving parts are rotating slow enough so as not to overcome the load on the driven parts, and the eccentrics 28 and 31 will therefore be considered as stationary. Each of the two masses will cooperate with its eccentric in the same way and therefore the case of one mass will be taken. The mass 24 for example, as the fly wheel rotates, is carried about in a circular path governed by the eccentric 28 and therefore with its axis at the center of the eccentric, the revolution of the mass being at the same rate as that of the driving parts, for example 1000 R. P. M. As shown in Fig. 4 the mass 24 stands radially outward from its eccentric 28, which is an extreme or dead center position, no transmission being delivered. During the succeeding half revolution the mass 24 will be at the left side of the central vertical plane. The existing centrifugal force in the mass will therefore be applied through the connection 30 as a leftward pull on the eccentric 28, tending to forward the eccentric and the shaft 35, that is turn them in the same direction as the revolution of the fly wheel. During this phase the mass travels from its extreme outward to its extreme inward position with respect to the axis of the driving parts, and the centrifugal force is transmitted as a turning moment through the eccentric to the shaft 35 and the driven parts beyond. When the mass 24 passes the lower dead center position and comes around into the second or outward phase, now to the right of the central vertical plane, the centrifugal pull of the mass tends to turn the eccentric and driven parts clockwise, or the opposite of the rotation of the driving parts. The one-way device comes into action during this phase to prevent such wrong direction of rotation, so that the centrifugal pull is ineffective. Under the assumed conditions substantially no load is imposed on the driving parts except the negligible work of overcoming the friction of the relatively moving elements. Minor accelerating and retarding forces are applied to the driving parts as the masses move inwardly and outwardly due to the necessity of speeding up the masses while moving outwardly and slowing them down while moving inwardly, but these factors are substantially counterbalancing and negligible. Ignoring these factors it will be seen that the matter of energizing the masses with powerful centrifugal pull, so as to deliver a great turning moment on the eccentrics and the shaft 35, is merely a matter of maintaining sufficiently great speed of rotation of the driving parts. Centrifugal force increases as the square of the rotary speed, so that increasing the engine speed from 1000 R. P. M. to 1400 R. P. M. will substantially double the centrifugal pull. Owing to this it is possible to produce and transmit a very powerful torque by sufficiently speeding the engine, whereas on the other hand by suitably slowing the engine the centrifugal force can be rendered substantially negligible, having the effect of wholly unclutching the driven parts from the driving parts, without any special attention or expedient, and without danger of stalling the engine. The operating conditions however, will be different from those above described when the driven parts, instead of being held stationary, are assumed as being rotated. When the driven load is overcome and the shaft 35 and eccentrics commence to rotate, for example by speeding up the fly wheel, at a speed less than the driving parts, a certain torque will be required to rotate the driving parts. This torque requirement will increase with the increase of relative speed of the driven parts, corresponding substantially with the ratio of the speed of the driven parts to that of the driving parts, or the inverse of the so-called speed ratio existing at the moment. When the conditions of power and load are such that the driven parts will turn at the full speed of the driving parts, constituting unit speed ratio, the existing torque in the driving parts 12, 15 etc. will equal the torque of the driven parts, or, otherwise stated, the engine torque necessary to turn the driving parts will then equal the torque of the load on the driven parts. The transmission thus meets the requirements and purposes of the present invention.

The preferred transmitting means between the intermittently advanced intermediate shaft 35 and the steadily rotating eventual driven shaft is a resilient propelling device embodying a yielding spring, which can be strained intermittently to impress power into it at one end, while relaxing steadily at the other end to deliver continuous torque to the driven parts. The spring might take different forms and accomplish the desired results, but it is found that an elongated helical spring 72 of proper character and construction is eminently suitable. As shown in Fig. 3 the resilient propeller or spring 72 is operatively attached at its front end to the rear end of the rotary sleeve 44, and extends rearwardly through the housing 53, to the driven parts. The essential qualities are found to be that the spring must have inherent strength and driving power to transmit the maximum torque actually required in practise, without impairment, combined with a sufficiently large capacity for yielding when in action to ensure that, under every condition of drive, the spring will remain under such a degree or extent of yield that its strain will never be wholly used up, or in other words that the spring will remain under effective driving strain, due to the inability of the rotating driven shaft to catch up with or overrun the intermediate shaft during the phases of non-rotation of the latter. It is believed that these results have not been heretofore attained and that with the present invention is embodied the first transmission of the class referred to in which the transmitting spring is capable of transmitting continuous forward drive under all phases and conditions. This important subject will be referred to further hereinbelow.

The driven parts proper may be said to begin with a sleeve 74 to which the rear end of the transmitting spring is secured, the sleeve being attached to the driven shaft 75 by means of a spline 76. An advantageous construction is to extend the driven shaft forwardly at 77 within the helical spring 72, not for the purpose of acting as an abutment to the contracting of the spring, but to preserve alinement between the sleeves and other parts at the forward and rearward ends. The front end of the shaft extension 77 is shown provided with a washer 78 which overlaps the front end of the intermittently driven sleeve 45, and is secured in place by a bolt 79.

The driven shaft 75 is slightly enlarged to the rear of the sleeve 74 and this enlarged part is shown as having a front roller bearing 81 and a rear bearing 82, with a special bearing box 83 supporting them and screw threaded into the flared portion of the housing or sleeve 53. The rear end of the shaft 75 may carry bevel pinion 84 engaging with the usual bevel gear 85 surrounding the rear wheel axles and carrying the usual differential.

Coming now to the reversing mechanism this will be described in connection with Figs. 1, 2, 5 and 7. There has already been described the one-way device 60, 62, 67 which is in effect during forward drive. A similar but complementary device may be used and put into effect for reverse drive.

The reverse pawl and ratchet or one-way device as shown comprises a series of resilient rollers or resilient pawls 90 cooperating with a corresponding series of inclined abutments 92, carrying leaf springs 93 pressing the rollers into wedging position. The abutments are formed on a disk 94, and a cover plate 95 is secured by bolts 96, to confine the rollers between the cover plate and the central web 68.

The plan of the present invention is to render one or the other, or both, of the one-way devices operative at will so as to bring about a condition of forward drive or reverse drive, or holding against any drive. The means for anchoring the respective disks 64 or 94 carrying the wedging abutments of the one-way device will now be described.

The disk 64 of the forward one-way device is rigid with its cover plate 65, which has attached to it by an annular flange, a cylindrical sleeve 100, from the forward edge of which extends outwardly an annular plate or friction ring 101, having suitable facings 102, and adapted to be braked by being squeezed between certain pressure rings, so that when under pressure the abutment disk 64 will be effectively anchored. The friction ring 101 is located between the fixed casing portion 18 and a pressure ring 103. This pressure ring is secured by a pin 104 to a sleeve 105 and a spindle 106, the sleeve having a shoulder against which the ring is positioned. There are shown four of these spindles, spaced circumferentially, and all attached to the pressure ring 103 in the manner described. Each spindle is arranged to slide longitudinally in a special boss 107 formed on the main casing 17, and the outer end of each spindle is provided with lock nuts 108 confining a pressure spring 109. This spring therefore pulls rearwardly on its spindle, and causes the pressure ring 103 to squeeze the friction ring 101 against the fixed element 18, thus anchoring the abutment disk of the forward one-way device. The sleeve 105 at its forward end contacts the flange or head 110 of the spindle, and the sleeve is here expanded into a second friction pressure ring 111, which is without function during forward drive. The described parts are shown in the upper part of Fig. 2 with the pressure spring 109 pulling rearwardly on the spindle and causing the pressure ring 103 to apply braking friction to the friction ring 101, and thereby to the abutment disk 64. An enclosing thimble 112 is shown covering the rear ends of spindle 106 and spring 109.

The means for putting reverse drive into effect correspond generally with, and are complementary to, those described for forward drive. Attached to the cover plate 95 is a sleeve 113 formed into an outwardly extending friction ring 114, carrying friction facings 115, for braking purposes, as best seen at the lower part of Fig. 2. Between these elements and the pressure ring 103 is another pressure ring 116 which is brought into action for reversing purposes. The outer edge of this is formed into a number of sleeves or lugs 117, namely four of them, alternated in position with the sleeves 105. A system of spindles 118 is shown engaged in the lugs 117, and each spindle is formed with a shoulder 119 capable of pressing forwardly on the lug and pressure ring 116. Each spindle 118 is surrounded by a light spring 120 pressing apart the pressure rings 111 and 116, so as to hold the ring 116 and the spindle normally rearward, as in Fig. 2, and therefore inoperative. It will be perceived that a forward motion of the pressure ring 116 will impose friction on the friction ring 114 and thereby anchor abutment disk 94, rendering the reverse one-way device operative. A forward thrust on the spindle 118 will give this result. At a certain point in the movement both of the one-way devices, forward and reverse, will be thus frictionally anchored, and this will give a holding or braking effect, tending to stop the drive of the vehicle, before reverse is applied. A further forward or inward thrust of the spindle 118 will cause a shifting forwardly of the pressure ring 111, spindles 106 and ring 103, thereby removing the spring pressure on the friction ring 101, and thus releasing and rendering free the abutment disk 64 of the forward one-way device, so that it can turn freely, and leaving the transmission under conditions of reverse drive.

By the advantageous arrangement described the pressure or pedal movement which causes engagement of the reverse clutch 114, 117 operates also through ring 111 to disengage the forward clutch 103, 101, against the pressure of springs 109. The operator therefore by an exertion only sufficient to disengage the forward clutch can at the same time engage the reverse clutch. This is because the same spring system or set 109 is arranged normally to serve both functions of holding closed the forward clutch and holding open the reverse clutch. Not merely the complication of a second spring system to hold open the reverse clutch is saved, but the double manual effort of overcoming the two sets of springs to make the shift. The light spring 120 is negligible.

Another advantage of the arrangement is that if the reverse is thrown in by the pedal while the machine or vehicle is still moving ahead this will not cause breakage or shock as the reverse friction clutch will act as a brake and slow down and stop the forward movement, and then being in reverse position it would, if the engine speed and centrifugal force of the masses be sufficient, operate to drive the vehicle backwards.

The shift of connections from forward to reverse drive may conveniently be effected by a pedal through connections such as the following. The four spindles 118 are connected by two exterior cross bars 122, as indicated in Figs. 2 and 5 and as shown more completely in Figs. 1 and 7. By pushing forwardly on the two bars 122 the four spindles 118 will be thrust forwardly, to pass through neutral or locking adjustment, and thence to reverse driving adjustment as explained. A pair of rocking cams 123 are shown for this purpose, mounted on studs 124 passing through supporting lugs 125 and 126 cast on the main casing. Each cam is extended outwardly from its pivot and there connected by a link 127 with a rock arm 128, the two rock arms 128 being mounted on a common rock shaft 129, which takes its bearing in the lugs 125 and 126, and at its outer left extremity is provided with an upstanding lever 130, on which pedal 131 may be mounted. By thrusting the pedal and thus rocking the shaft 129 the links 127 are shifted, and the cams 123 are swung and pressed forwardly on the cross bars 122 so as to thrust the four spindles 118 forwardly to change the driving adjustment through an intermediate condition, as described, to the adjustment for reverse drive.

Figure 1:
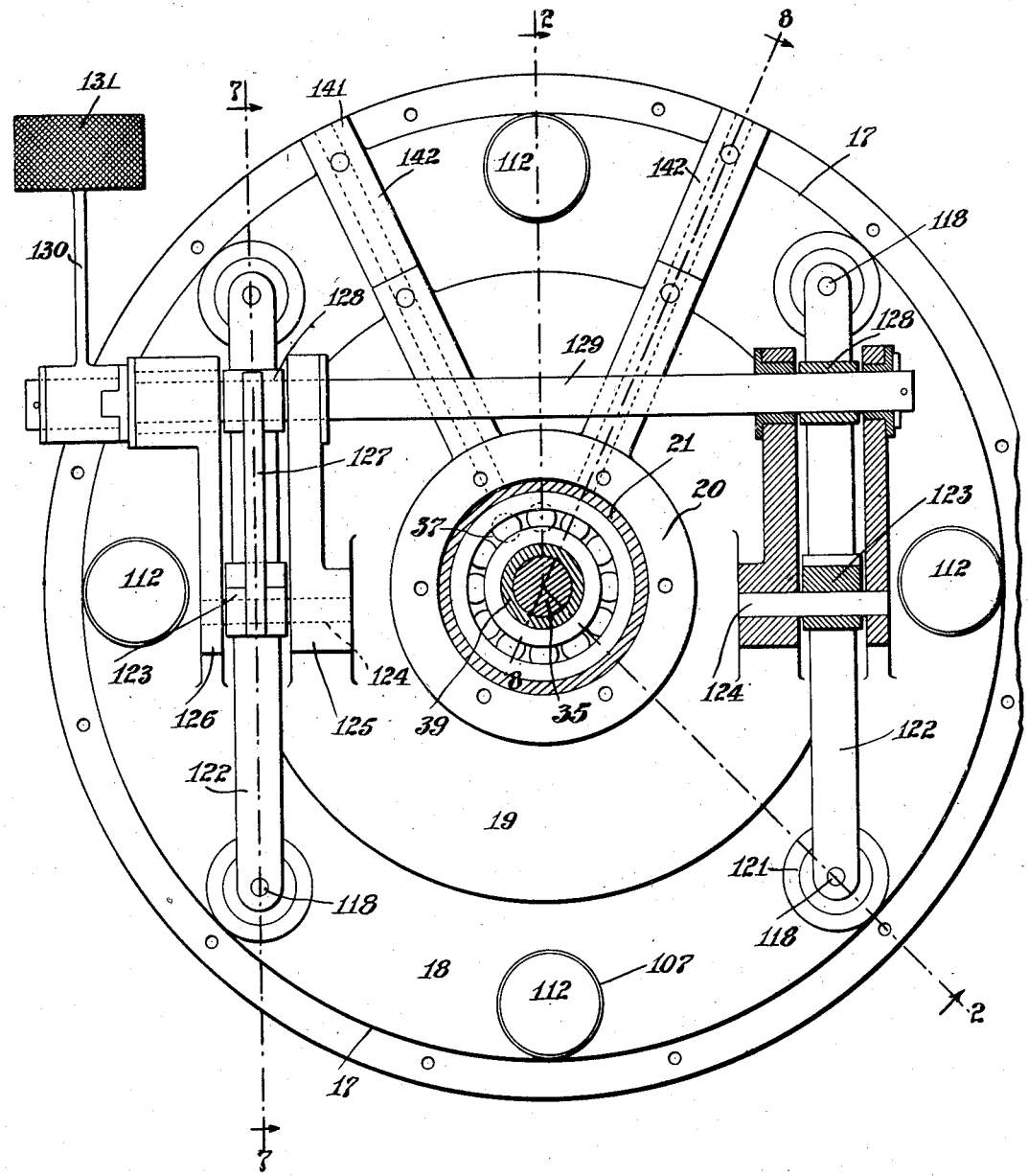
Figure 8:
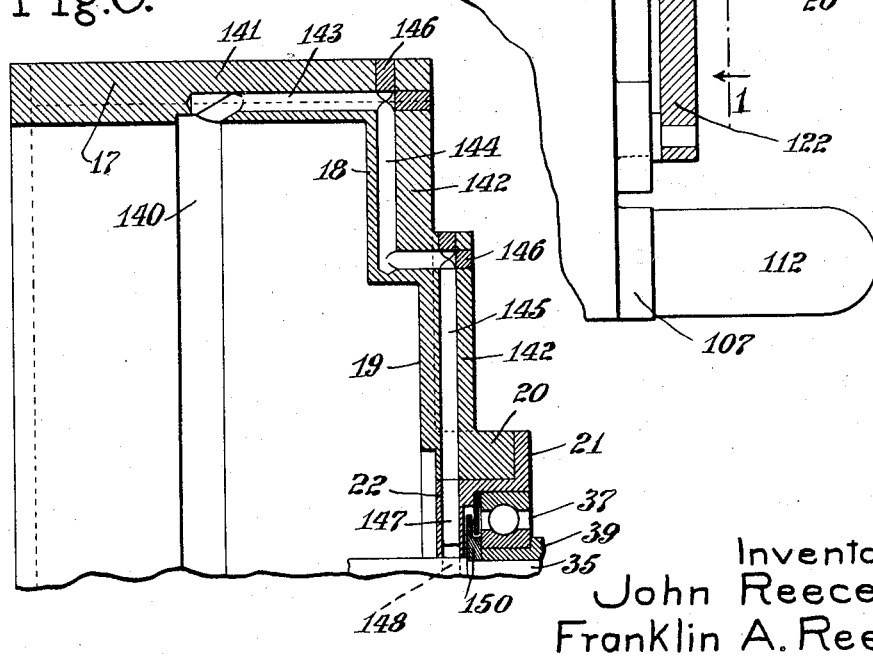
Fig. 8 is a radial section of the main casing taken on the line 8—8 of Fig. 1, and showing the oil circulation system.

The lubrication system is indicated in Figs. 1, 2 and 8, and serves to maintain a constant circulation of oil, which is preferably maintained in plentiful quantities within all parts of the main casing. At the interior circumference of the main casing is shown a circumferential recess or gutter 140 located about midway of the length of the casing. It will be understood that the lubricant is whirled around by the rotation of various parts and is under centrifugal pressure, thus tending to accumulate at the periphery and in the gutter or race 140. The casing at its exterior side has one or more longitudinal ribs 141, and connecting radial ribs 142, as indicated in Figs. 1 and 8. In each of the ribs 141 is a longitudinal oil channel 143 connecting with the gutter 140. The oil being under pressure therefore tends to enter the channel 143 and travel along it. This channel connects with a radial channel 144 in the rib 142 and this in turn with a continuation thereof 145. These channels may be formed by boring, as will be understood from Fig. 8, the external openings being closed by plugs 146. The forced circulation of oil through channels 143, 144 and 145 is continued through a channel 147 formed in the fixed annular piece 22 already referred to, this channel being extended annularly directly at the shaft 35. As seen in Fig. 2 the shaft is interiorly channeled at 148 to receive the oil under pressure from the channel 147, and the various branches of the shaft channel lead to various points such as the eccentrics 28 and 31 and the disks 64 and 94. As seen in Fig. 2 an oil guard 150 may be interposed to prevent exit of oil at the bearing 37, and an outwardly inclined passage 151 will serve to drain all oil therefrom into the interior of the casing. An oil guard 152 is shown excluding oil from the bearing 36.

Referring again to the propeller spring 72, its characteristics and advantages will be best explained by comparison with the nearest prior structure, which so far as we know is that shown in said prior Patent 1,461,557. In that patent the transmitting spring is short and of inadequate capacity and strength for the purposes of the present invention. The spring of the prior patent is helical and consists of only twenty convolutions, being so small in fact that it is accommodated wholly within the transmission casing, while the following driven shaft occupies the greater part of the longitudinal distance from the transmission to the rear axle. Practical experiments have indicated that the prior spring is inadequate for motor car purposes. The available amount of yield or strain of the spring is insufficient, and the strain will be, at certain times and under certain conditions of heavy load, wholly taken up, and the transmission will then operate as though the intermediate and driven shafts were solidly connected, without an interposed spring. Moreover under certain conditions of light load it is possible that the driven parts will overrun the spring and intermediate parts, rendering the transmission of torque discontinuous, with the result that there will be transmitted to the vehicle a distinctly pulsating drive, which may be quite appreciable in the movement of the vehicle itself. It is true that the prior patent states that the spring can yield by the amount of several complete turns, but this was only done by the special plan shown in said prior patent of making a number of convolutions of relatively low strength, the result of which would be a breakage or impairment of the spring under the hardest conditions, unless indeed the spring is supplemented and backed up, as is shown in the patent namely by interior stop rings, which limit the contraction of the helical spring. But this necessary expedient in itself tends to prevent the frequently necessary extent of yield. Furthermore, while the prior spring may yield several turns with heavy loads and low speed ratio, as stated in the patent, this is not the only condition responsible for the objectionable pulsating action. A high load will give a large strain upon any propeller spring and wind it up a substantial amount. It is when the load is light and the ratio is high, or near unity, that the pulsating drive action is found to occur, for example at a ratio of six to five. When the driven shaft is thus turning slightly slower than the driving or engine shaft each of the centrifugal masses will be pulled slowly inward during about five and one half turns of the driving shaft, and will then move rapidly outward for about one half turn of the driving shaft. During the first or prolonged phase torque will be transmitted to the intermediate parts, spring, and driven shaft, but during the brief return phase the intermediate parts are momentarily stationary, while the driven parts continue in rotation, and may overrun the propeller spring and intermediate parts if the spring at this time is under insufficient yield or strain. It may be shown that if the propeller spring, during the transmitting phase, is placed under a strain or yield of about one complete turn, or 360° more or less, continuous transmission will ordinarily be assured, whereas if the yield is only about a half turn or 180°, or less, the irregular or pulsating transmission will result.

The plan of the present improvement therefore is to employ a spring such that about or at least a full revolution of yield will occur in each cycle, under any practical conditions of load and ratio, and which yet will be strong enough, without impairment, to transmit torque at low ratio for overcoming even the heaviest loads. The proper strength may be assured by employing spring steel of high quality and of cross section sufficiently large, and preferably uniform. A short spring of this character would not yield enough to prevent the overrunning trouble. But by employing a spring of this character and greatly elongating the length of metal used in the spring, and the longitudinal length of the helix itself, the proper amount of yield is assured. As already stated this is herein accomplished by providing a propeller spring 72 of moderate helical diameter and maximum longitudinal length. The principles involved are distinct from those explained in the prior patent, and give the result of smooth and continuous transmission not afforded by the patent, and overcome a troublesome defect.

In order to make more clear the principles of the improvement in discussion, so as to enable those skilled in the art to practice the same, a specific instance may be described. Supposing an internal combustion engine delivering torque of 100 foot pounds through a fly wheel and transmission of the class herein referred to, the propeller spring may be of the following character. The mean diameter of the spring or helix may be 2″ and the number of convolutions 90 to 95 more or less, so that in Fig. 2 about 75 turns may be considered as having been omitted from the middle to condense the illustration. The longitudinal length of the spring may be about 5′6″, more or less. The wire or rod from which the spring is made may be of square cross section, as shown, with dimensions of 7/16″ deep and 1/2″ wide. The metal may consist of chrome vanadium steel heated to 1650° F. and drawn to 650° F. The minimum yield of such a spring occurring in each cycle will be in the neighborhood of 360°, and will be three times as great under a torque of 300 foot pounds. In order to show the delicacy of the problem solved by this invention it is pointed out that if the propeller spring be weakened by reducing the depth of its cross section from 7/16″ to 6/16″ the maximum practical stress would impose too high a strain on the spring and run the danger of breaking or permanently distorting it. If on the other hand the depth be increased to 8/16″ the spring will be too stiff, and the extent of yield may be reduced to an amount perhaps as low as 180°, which under certain speed ratios will permit the driven shaft to overrun the spring, and give the objectionable pulsating action. The improvement therefore is clearly not one of mere degree over the prior patent since the increase of length of the spring introduces a new factor and gives a new sort of result, not previously attained. While the full 5 1/2 feet of longitudinal length of the propeller spring may not in all cases be necessary, the length of spring shown in the prior patent is insufficient for the purposes of the present invention, and, without the special expedients characterizing the patent, would have to be enlarged to an extent such that, with an elastic strength sufficient to prevent impairment under the greatest stress, the spring nevertheless will afford a yield great enough to insure against overrunning and consequent objectionable pulsating drive.

It will thus be seen that there has been described a power transmission apparatus embodying the principles and meeting the objects of the present invention; and since many matters of combination, arrangement, operation, mechanism and detail may be variously modified without departing from the principles of the invention it is not intended to limit the invention to such matters except so far as set forth in the appended claims.

What is claimed is:

1. Power transmission apparatus comprising the driving and driven members and a revoluble support turned by the driving member, in combination with a centrifugal mass arranged on said support to be revolved bodily about the axis thereof while movable inwardly and outwardly thereon, a rotary propeller member, a connection from the propeller member to the mass for alternately causing the mass to move inwardly and allowing it to return outwardly when the rotary speed of the driven member is less than that of the driving member, a one-way device preventing the propeller member rotating in reverse direction during the outward movements of the mass when driving forwardly, a second one-way device preventing the propeller member rotating forwardly when driving reversely, a clutch for applying the first device, a second clutch for applying the second device, a spring means arranged normally to hold the first clutch applied for forward drive and to hold the second clutch open, and connections operated at will arranged to overcome said spring means and thereby to open the first clutch and apply the second clutch for reverse drive.

2. Power transmission apparatus comprising the driving and driven members and a revoluble support turned by the driving member, in combination with a centrifugal mass arranged on said support to be revolved bodily about the axis thereof while movable inwardly and outwardly thereon, a rotary propeller member, a connection from the propeller member to the mass for alternately causing the mass to move inwardly and allowing it to return outwardly when the rotary speed of the driven member is less than that of the driving member, a one-way device preventing the propeller member rotating in reverse direction during the outward movements of the mass when driving forwardly, a second one-way device preventing the propeller member rotating forwardly when driving reversely, a clutch for applying the first device, a second clutch for applying the second device, and a single controller for applying either clutch at will, and so connected that at its middle position it holds both clutches applied thereby to brake the driven member.

In testimony whereof, we have affixed our signatures hereto.

JOHN REECE.
FRANKLIN A. REECE.